W. EVANS.
TRIMMING MACHINE.
APPLICATION FILED MAY 5, 1915.
1,164,337.
Patented Dec. 14, 1915.
5 SHEETS—SHEET 1.
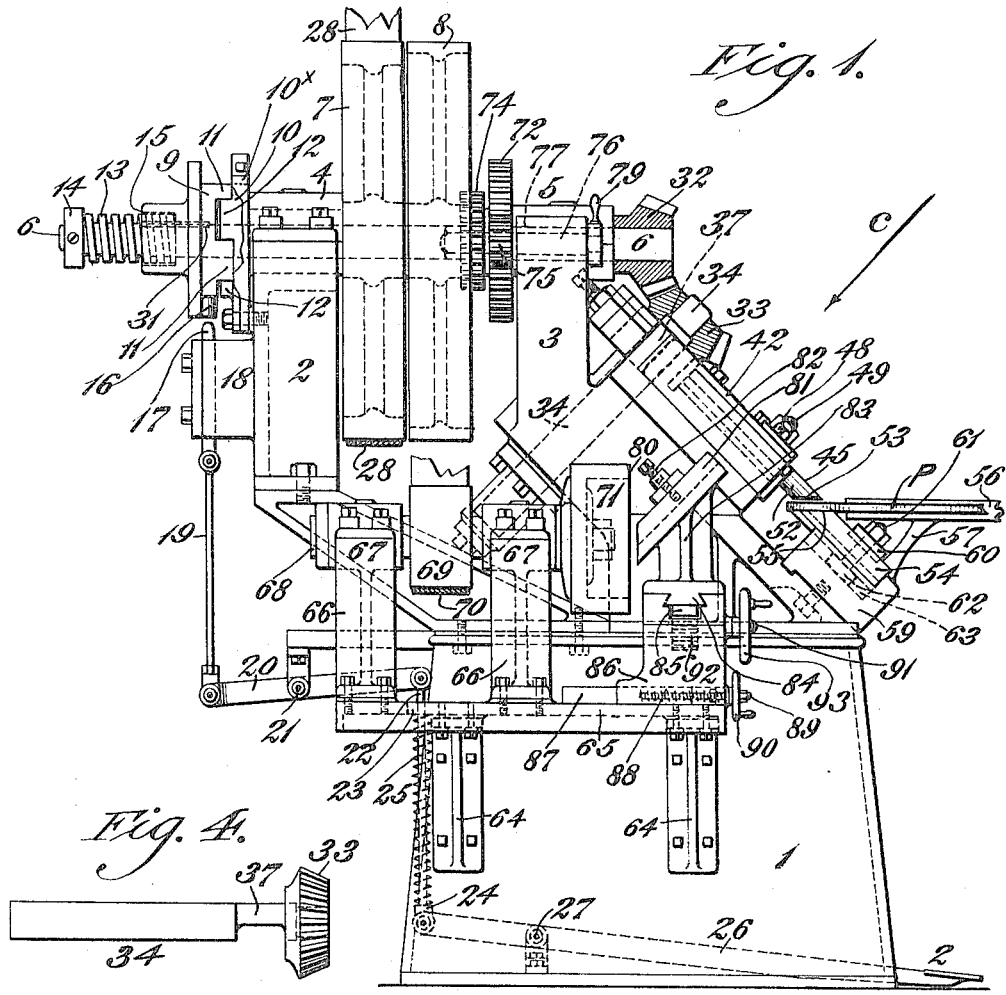

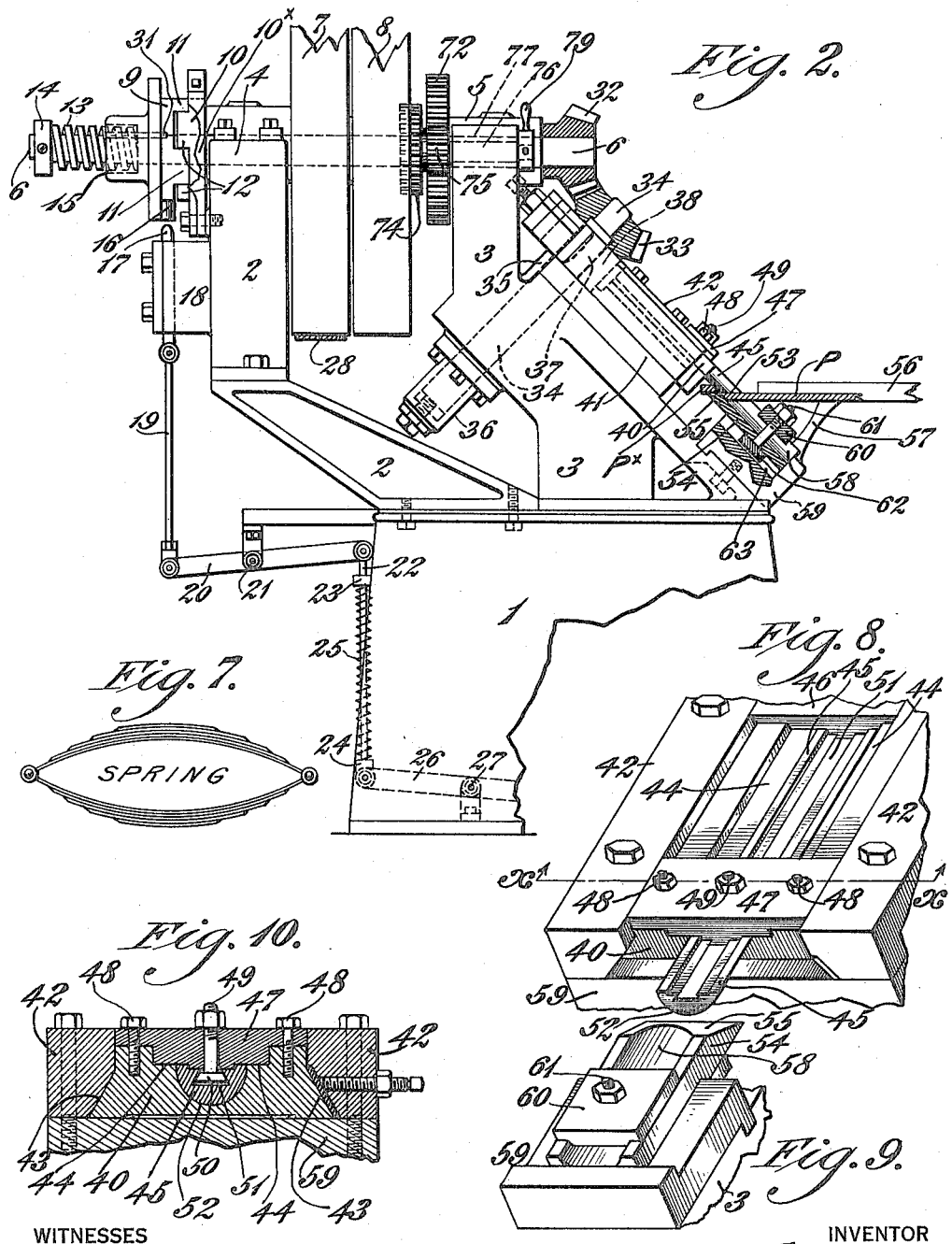

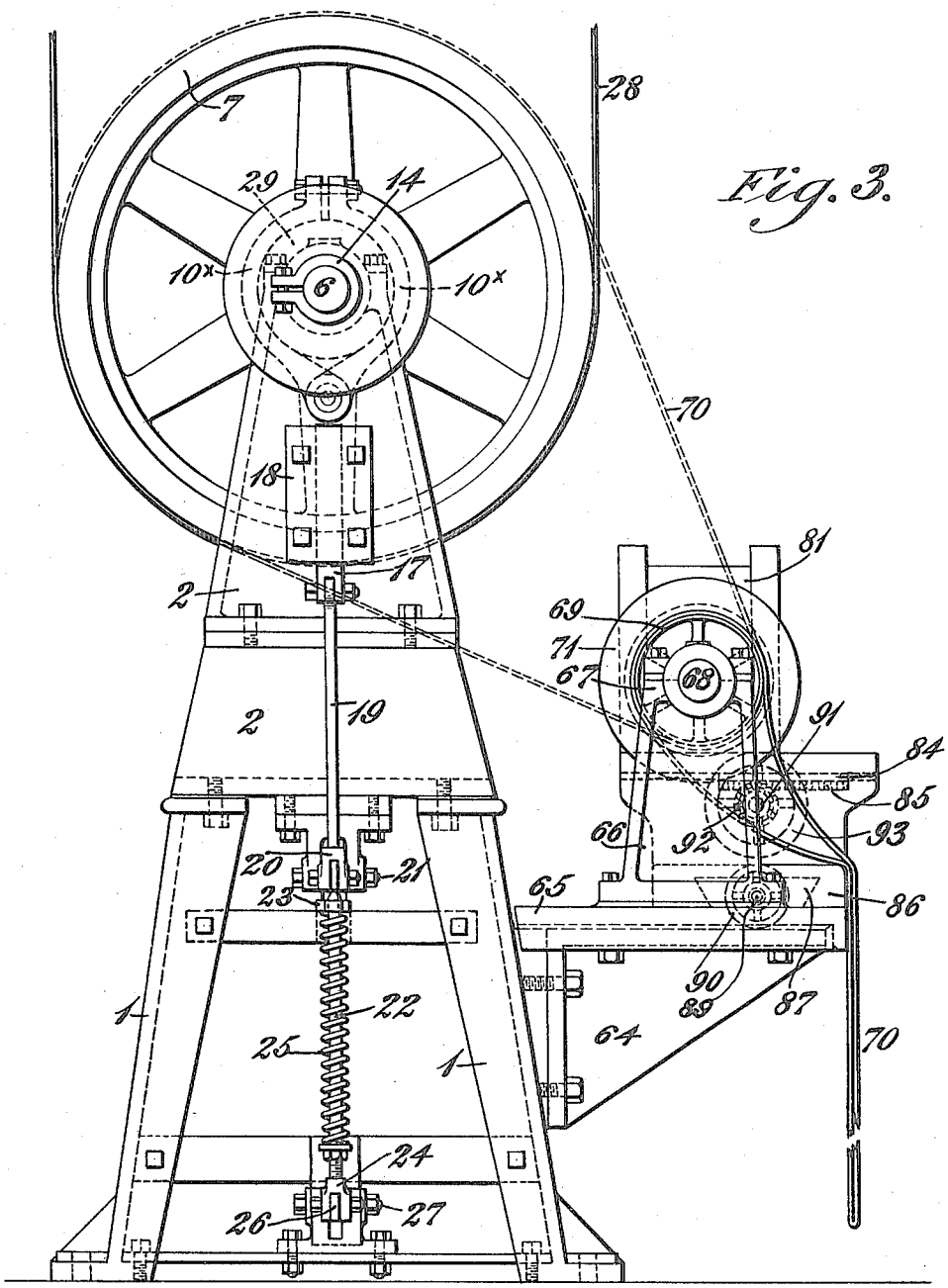

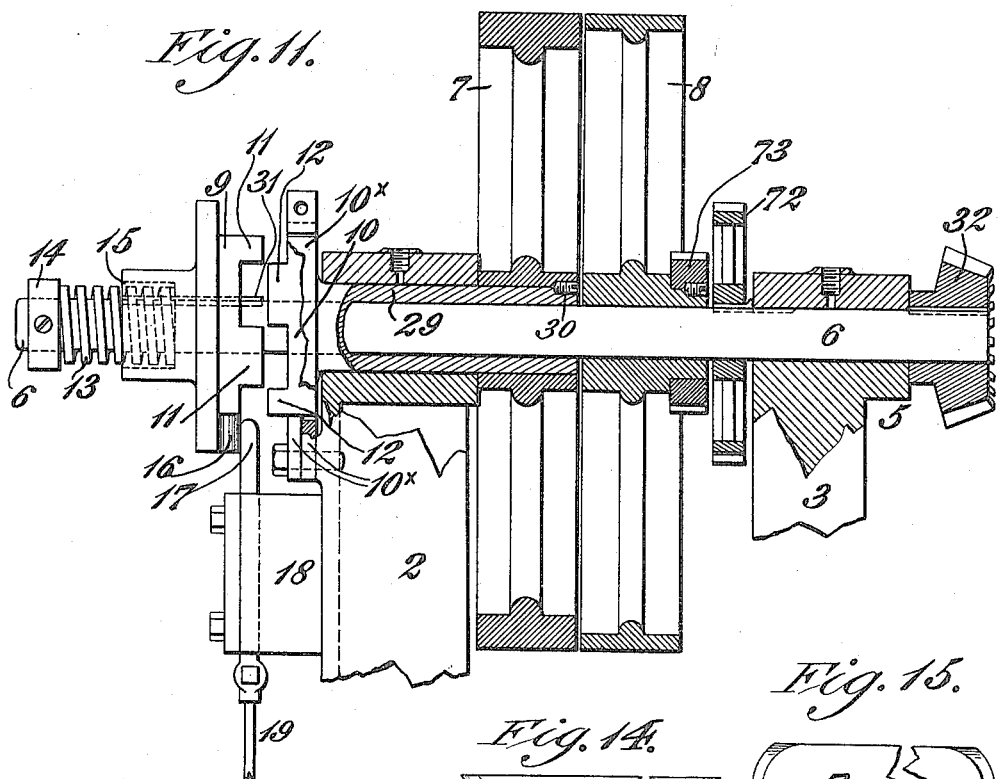

W. EVANS.
TRIMMING MACHINE.
APPLICATION FILED MAY 5, 1915.
1,164,337.
Patented Dec. 14, 1915.
5 SHEETS—SHEET 5.
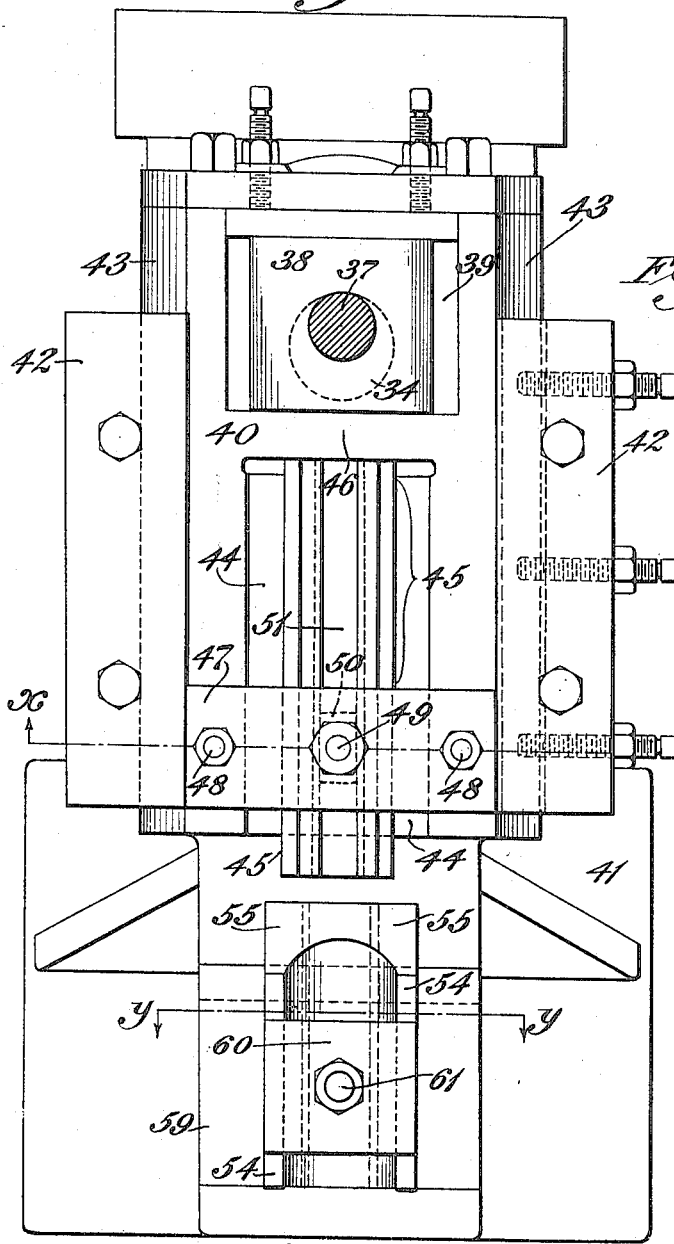
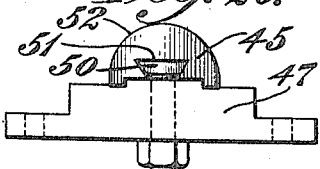
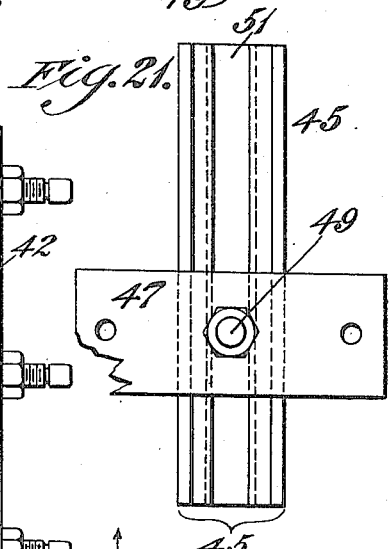
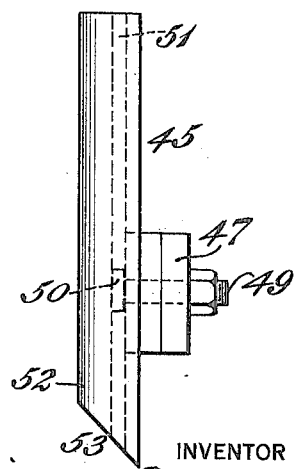
WITNESSES
INVENTOR
William Evans
BY Niederheim & Fairbanks
ATTORNEYS

UNITED STATES PATENT OFFICE.

WILLIAM EVANS, OF OAK LANE, PENNSYLVANIA, ASSIGNOR TO JOHN EVANS' SONS, A FIRM COMPOSED OF WILLIAM EVANS, ROBERT EVANS, AND JOHN H. EVANS, OF PHILADELPHIA, PENNSYLVANIA.

TRIMMING-MACHINE.

1,164,337.

Specification of Letters Patent.

Patented Dec. 14, 1915.

Application filed May 5, 1915. Serial No. 25,901.

*To all whom it may concern:*

Be it known that I, WILLIAM EVANS, a citizen of the United States, residing at Oak Lane, in the county of Montgomery, State of Pennsylvania, have invented a new and useful Trimming-Machine, of which the following is a specification.

My invention relates primarily to the art of manufacturing vehicle springs, and particularly to that art so far as it is concerned with the making of heavy springs of high-grade steel for use in vehicles of the general type of automobiles and trucks.

It comprehends primarily a machine for trimming the ends of the leaves or bars or plates of which elliptical springs are composed, so as to give them a rounded-edge contour.

In the manufacture of the plates of springs as heretofore conducted, it has been both customary and necessary to draw the ends of the spring plates to a taper and then trim their points or ends to a desired shape, varying, of course, with the character of the spring. By this method, it has been found that the temper of the plates has varied according to the difference of thickness of the tapered portion, and obvious disadvantages have resulted.

The primary object of my invention which I describe and illustrate in connection with the plates of elliptic springs,—although it is applicable to the trimming and treatment of metal bars of other character and for other uses,—is to cut off to a given and desired outline the end of the plate or bar, and in so doing and simultaneously therewith to form or strike a bevel upon the edge so outlined, both operations being completed at one time or as a single stroke, and the resultant product being one which is absolutely free from the fin which under the old operations inevitably remained and required to be finished or polished or ground off.

Otherwise to express it, the principal object of my invention is the construction of a machine designed and operative to trim or shape the ends of spring plates or other bars which have not been drawn or tapered but which are technically known as of "full thickness."

A further object is the construction of a machine which in a single operation gives to the end of the plate to be operated upon, both its ultimate outline and its curved or rounded contour of outline, and by so doing avoids the expense of the old operations which involved the two steps of, first, striking the bar to give it its desired end-outline, and, second, trimming by grinding or polishing the outlined end of the bar to give it its desired curvature or end-contour.

A further object is to accomplish the foregoing results by devices of simple character but positive action, durable, dependable and relatively inexpensive.

To the foregoing and other ends, my invention comprehends an organized machine, the fundamental and necessary operative elements of which are a pair of coacting cutters, blades or dies, one of which is movable and the other of which is fixed, and which are so related to each other or so formed as to either embody or be combined with a supporting or holding plate or surface, preferably having a gage, in order that the relation of the plate or bar to be cut to the cutting elements will be one of oblique angularity, preferably of about 45 degrees.

Otherwise, again, to express it, the two members of the die possess oppositely-correspondent forms, matching and meeting each other and adapted to be brought together to perform an act of cutting upon the end of a bar to give it a predetermined outline, and at the same time to perform an act of shaping-over or rounding or beveling the end so outlined, to the desired bevel, it being of the essence of the relationship only that the two members of the die should be adapted to be brought together and separated, while at the same time they occupy together, or considered as a single element, a relationship angular to that of the bar which is presented to them to be operated upon by them.

My invention further comprehends, in an organized machine adapted to embody the foregoing elements, means for operating the movable element or member of the die proper, and means for supporting or gaging the position of the article to be operated upon relatively to the dies, without regard to the general construction of such operating and holding means.

Although I prefer a machine of the special organization represented and described, I regard it as typifying merely an organized machine adapted for the purpose. Notwithstanding this, however, my invention in its details comprehends specific constructions represented and described, and hereinafter specifically claimed.

For the purpose of illustrating my invention, I have shown in the accompanying drawings a certain type and embodiment of it which is at present preferred by me, since in practice it has given satisfactory and reliable results. It is to be understood, however, that the various instrumentalities in which my invention is embodied can be variously arranged and organized and that my invention is not therefore limited as to the precise arrangement and organization of the instrumentalities typified in the constructions depicted in the accompanying drawings and herein described.

Figure 1 represents a side elevation of a trimming machine embodying my invention, all of the parts being shown in the position which they occupy before they are brought into action to effect the trimming of the plate. Fig. 2 represents a fragmentary view of the machine represented in Fig. 1, in the position which the parts occupy after they have been brought into action to operate upon the plate, the devices for grinding the cutters being, for clearer illustration, omitted. Fig. 3 represents an end elevation, viewed from the left-hand side of Fig. 1, of the complete machine represented in said Fig. 1. Fig. 4 represents a detail of the beveled pinion, shaft and shaft crank which operate the moving cutter. Fig. 5 represents a top plan view of the cutter grinding device which I find it convenient to employ for the sharpening of the cutters. Fig. 6 represents an end view of the moving member of the main or driving clutch. Fig. 7 represents a side elevation of an elliptical spring the plates of which are of "full thickness" and trimmed as to their ends by my machine. Fig. 8 represents in fragmentary perspective, the carrier of the moving cutter or moving element of my die, removed from the machine. Fig. 9 represents a similar view of the fixed cutter or fixed element of the cutting organization as an entirety. Fig. 10 represents a transverse, vertical, section elevation on the dotted lines x—x of Figs. 8 and 18, sight being taken in the direction of the arrows upon said line. Fig. 11 represents in longitudinal, vertical, side, sectional elevation the driving shaft of the machine, its clutch, the driving pulleys, the toothed gears which control the action of the grinding mechanism, and the driving bevel pinion of the bevel gear which operates the carrier of the moving cutter. Fig. 12 represents, in side elevation, the driving gears which control the operation of the grinding mechanism, the gears being in engagement. Fig. 13 represents a fragmentary detail of certain of the gears represented in Fig. 12, disengaged. Fig. 14 represents in side elevation and Fig. 15 in plan, both fragmentary, a plate of an elliptic spring trimmed as to its ends to the usual rounded form by the operation of my machine. Figs. 16 and 17 respectively represent the ends of plates or bars trimmed to a tapering and to a squared end by the operation of my machine. These last mentioned four views are illustrative simply of forms which a trimming machine embodying my invention is adapted to produce. They are, however, not the only forms that can be produced, because by the requisite shaping of the dies, other desired forms can be produced. Fig. 18 represents the upper or outer surface of the cutting members of my machine, the view being taken in the direction of the arrow C in Fig. 1, and the parts being in the position represented in said figure—that is to say, with the two cutters separated. Fig. 19 represents in transverse section on the dotted line y—y of Fig. 18, the fixed cutter. Fig. 20 represents in end elevation and viewed from above, the moving cutter shown in Fig. 21. Fig. 21 represents in plan the moving cutter removed from its frame. Fig. 22 represents in side elevation the cutter represented in Figs. 20 and 21.

Similar numerals of reference indicate corresponding parts.

Referring to the drawings: 1 designates the base frame-work of the machine, of any preferred formation, but preferably of that shown in Figs. 1, 2 and 3. Upon the top of this frame-work and bolted to it, are brackets 2 and 3, the conformation of which will be best understood by reference to Figs. 2 and 3. Their shape is that shown because it best serves the purpose for which they are intended, which is primarily to support the bearings 4 and 5 for the driving shaft 6, which carries the pulleys 7 and 8, as best shown in Fig. 11. This driving shaft is the prime mover of the machine, adapted, preferably by a spring-controlled treadle operating through a clutch, to be thrown into or out of rotation, and carrying a member of the beveled gear which operates the cutting mechanism.

In the preferred form, the driving shaft at its left-hand end carries the moving member 9 of the clutch, the fixed member of which is designated 10. The clutch lugs of the moving member are designated 11, and those of the fixed member 12. They are adapted to be thrown together or separated in any usual manner. I, however, prefer to accomplish their throwing together by a spiral spring 13 on the end of the shaft, abutting between a fixed collar 14 on the shaft and a socket 15 within the outer face of the moving clutch member 9. Their separation is accomplished in the following manner:—The inner face of the moving member of the clutch is formed with a double-faced trip-lug 16, Figs. 1, 2, 6, and 11, adapted to encounter the upper end of a clutch rod 17, passing through a bearing 18 on the frame bracket 2, above which its end protrudes, and which is connected at its lower end by a link 19 to one end of a lever 20, fulcrumed at 21 in the frame, the other end of which is connected with a treadle 26, by a lower link 22, which passes through a bearing 23 on the frame, which serves not only to guide the link but to form one of the abutments for a treadle-returning spring 25 which surrounds said lower link, the other abutment being designated 24 on the link 22.

26, as stated, designates a foot treadle fulcrumed at 27, the inner end of which is connected to the lower end of the link 22.

Obviously, in the rotation of the moving member 9 of the clutch, which is free to slide on the driving shaft 6 but splined thereto and rotatable therewith, the contact of the trip lug 16 with the clutch rod 17, when the latter is thrown up by the depression of the treadle, will cause the movement of the moving member of the clutch lug away from the fixed member so as to unlock the two and stop the rotation of the driving shaft.

The effect of the release of the treadle through the expansion of the spring 25, will be to depress the clutch rod so that it will clear the trip lug and permit the spring 13 to throw the clutch members into locking contact, because, as will be apparent from Fig. 11, the fixed and unslidable member 10 of the clutch is mounted upon the outer end of a sleeve 29 surrounding and rotatable upon the exterior of the driving shaft and keyed as at 30 to the driving pulley 7.

10$^x$ designates a friction clamp of any preferred character, which is mounted and exerts a tension upon the end of the sleeve 29.

On the right-hand end of the driving shaft is keyed the driving bevel pinion 32, which meshes with a driven bevel pinion 33, keyed upon the outer end of a driven shaft 34, housed in the bracket 3 of the framework between an upper bearing 35 and a lower or thrust bearing 36 also attached to the bracket 3, and of any preferred character.

It will be apparent that the rotation of the driving shaft through the bevel gears 32 and 33 occasions a coincident rotation of the driven shaft 34, which is the element I find it convenient to use to impart the desired up and down or reciprocatory movement to the moving member of the cutters. This movement I conveniently accomplish by the following means:—The driven shaft 34 near its pinion end is turned down or shaped so as to form a wrist pin 37, Figs. 1, 2 and 4, which passes through and, in the rotation of the shaft, acts upon a traveler 38, Fig. 18, being a block housed within what I term a traveler way 39 formed in the cutter carrier 40. The office of this traveler, as any mechanic will understand, in its both up and down and its lateral travel, is to raise and lower the cutter carrier considered as an entirety, and in so doing impart to the moving member of the cutter its up-and-down or in-and-out movement relatively to the fixed member of the cutter.

I deem it unnecessary to elaborate the description of the cutter carrier as a mechanical device, because its construction may be varied and because a simple and mechanical construction is indicated in the drawings, and particularly in Fig. 18 thereof, which is a working drawing. It is sufficient to say that the carrier travels within any preferred form of housing or bearing 41, which is supported in the bracket 3, and is secured by means of angularly-inclined retaining plates 42, which overlap and guide its own inclined edges. The carrier at its lower end is formed with a longitudinal cutter slot 44, within which is introduced and retained the moving member of the cutting die 45,—the retention being effected by interposing the moving cutter member between a fixed cross bar 46 of the carrier, and a retaining plate 47 to which the moving cutter is secured by a retaining bolt 49, the head 50 of which is beveled and adapted to fit within a slot 51 formed in the moving cutter, as a reference to Figs. 8, 10, 18, 20, 21 and 22 will indicate. Obviously, the adjustment of the moving cutter relatively to its carrier may easily be effected.

As already explained, I contemplate the use of cutters of varying forms in order to enable me to cut the ends of bars to varying outlines and at the same time bevel their outlined edges to the desired bevel,—and, as explained, Figs. 16 and 17 indicate two forms of beveled ends of bars. As, however, my invention is primarily concerned in the forming of a circular rounded end for a spring plate, the dies which I have illustrated and am describing are of circular shape to effect a circular,—that is to say, partly circular,—outlined end cut, while the cutting edge of the moving die has a relatively forty-five degree inclination.

52 designates the convex, longitudinal, external surface of the moving cutter, and 53 the angular cutting end, as best shown in Figs. 8, 10, 20 and 22.

54, Figs. 9, 18 and 19, designates the fixed cutter or die with which the moving cutter coöperates, and which is formed with a face 55, which as to its end is a cutting edge and which also serves as a rest or support or carrying surface, upon which the end of the plate or bar to be trimmed is placed and lies. The plate is preferably directed into position upon the surface 55, by the gage 56, which controls its proper placing, all as shown in Fig. 1, in which the plate to be cut is designated as P. The gage, which is a desirable adjunct, may be of any preferred character, and is shown as supported upon a bracket 57 springing from the frame-work.

The fixed cutter in the form under discussion, is shown as longitudinally channeled or concaved at 58, so as to correspond in opposite-counterpart relationship to the opposite or convex curvature 52 of the moving cutter, which in its stroke travels a very slight distance into the concave 58, as shown in Fig. 2. This fixed cutter is conveniently fitted upon the face of a retaining block 59 secured to the frame-work.

A cap plate 60, held in place by a bolt 61, the head of which 62 is bevel-faced and fitted within a beveled way 63 in the retaining block 59, retains the fixed cutter in the desired position, and permits of its longitudinal adjustment.

In the operation of my machine, it is to be understood that the plates or bars to be cut are, prior to their introduction to the dies, heated to a higher degree than eleven or twelve hundred Fahrenheit, and preferably to a soaking heat of, say, approximately fourteen hundred Fahrenheit.

The result of the cutting action more or less independently of the degree of heat of the bar, is to dull the cutting edges of the cutting dies, and I, therefore, provide a means for sharpening either member of the die, directly connected with the die-driving mechanism of the machine and adapted to be quickly thrown into operation. This I accomplish by a grinding mechanism particularly illustrated in Figs. 1, 3, 5, 11, 12 and 13, and of the following construction:—
64 designates carrying brackets connected with the frame-work proper of the machine, and supporting a carrying bed or table 65. Upon this table are erected standards 66 for bearings 67, within which is journaled a countershaft 68, having a driven pulley 69 in line with the driving pulley 8 on the driving shaft 6,—the connection being by a pulley belt 70, shown both in place and thrown off in Fig. 3.

As already explained, the driving pulley 8 is free on the main shaft. A convenient means for making it fast upon said shaft when its rotation to operate the countershaft 68, which carries the emery or other grinding wheel 71, is desired, is the following:—Referring particularly to Figs. 11, 12 and 13,—72 is a toothed gear wheel fixed on the driving shaft 6 and rotatable with it, and 73 is a smaller toothed gear wheel fast on the hub of the pulley 8, and adapted to be engaged with a counterpart pulley 74 mounted and fixedly connected with a toothed pinion 75, both mounted on a crank member 76 of a rock-shaft 77 housed in a suitable boxing 78, springing from the bracket 3 of the main frame, and adapted to be thrown into and out of engagement respectively, that is, 74 with 73, and 75 with 72, by a rock handle 79 or other appropriate lever on said rock-shaft. The two positions above referred to are indicated in Figs. 12 and 13, respectively, and, obviously, so soon as the teeth of the wheels mentioned are thrown into engagement, the rotation of the driving shaft 6 through the gears 73 and 75, 74 and 72, will occasion the rotation of the pulley 8, and, when the belt 70 is upon the pulley 69 on the countershaft 68, the rotation of said countershaft and the consequent revolution of the emery wheel 71.

The emery wheel 71 is preferably of the shape represented in Figs. 1, 3 and 5 of the drawings, but obviously it may be of some other shape. As illustrated, its cutting face, designated 80, is upon its side periphery, against which either one of the two members of the die to be sharpened is placed and held in the die carrier 81.

As it is desirable that the grinding wheel should operate with respect to either one of the cutting dies,—both of which as will be understood are removable,—I find it convenient to employ a die carrier 81, the detailed construction of which it is unnecessary to enlarge upon, except to say that it is so formed as to receive either one of the dies which can be introduced and secured upon it at a proper angle to the grinding face of the wheel, by a binding screw 82.

For purposes of adjustment, the die carrier 81 is conveniently mounted upon a traveling support 83, which is mounted by a dovetailed slide joint 84 the under face of which is provided with a rack 85, upon a second traveling support which I call the lower support 86, itself mounted upon the carrying bed 65. The support 86 travels upon a dove-tailed slide groove 87 on the table 65 and is provided with a threaded traveler 88, through which passes an adjusting screw 89, fitted with a hand wheel 90, adapted to cause the travel of the lower support 86 toward or from the grinding wheel.

91 designates a shaft housed in the lower support 86 and provided with a pinion 92 engaged with the rack 85 of the upper traveling standard 83, and provided also with a hand wheel 93 for rotating it. Obviously, through the control of the upper support 83 and the lower support 86, respectively by their rack-and-pinion and their threaded-shaft-and-wheel operated devices, the die carrier 81 can be caused to travel in and out from the grinding face of the grinding wheel and also transversely across it, to effect the desired sharpening of the die on the carrier.

The devices which operate the movement of the die carrier may, of course, be varied, and those described are simply well adapted from a mechanical viewpoint to accomplish the desired result.

The operation of the machine so far as it has not already been described, may be stated to be as follows:—Assume a plate P to have been placed on the cutting face 55 of the fixed cutter 54, the gage 56 having assured its correct lateral placement, all as shown in Fig. 1:—The end of the plate, as will be observed, extends beneath the inner edge of the moving cutter, and as the latter is caused to descend,—by the pressure upon the treadle, operating through the clutch upon the driving shaft, through said shaft, the bevel gearing and the driven shaft, as fully explained,—the end of the plate will be cut by said edge and forced down into the channeled groove 58 of the fixed cutter 54, as shown in Fig. 2, with the result that the cut and outlined edge of the plate will be wiped down, so to speak, into the channel, smoothed to the desired degree of smoothness, and left without any such fin as necessarily results, as already explained, from the old operation of stamping, before the manual grinding or other dressing operation removes it.

There will be left by my operation, as shown in Fig. 2, upon the cutting face 55, only a scrap or cut-off fragment of the end of the bar which I have designated P$^x$ and the outlined and beveled end of the bar itself will be perfectly smooth.

I believe that the effectual rounding off of the end of the bar and the elimination of an edge or fin which is the result of the operation of my machine, and amounts almost, so to express it, to an operation of forging, is due to the wiping effect of the action of the moving die upon the fixed die,—their outlines, as has been already fully explained, being oppositely-correspondent or counterpart,—and the resultant being, so far as I know, absolutely new in the trimming or rounding of the ends of bars generally, and especially when they are technically of "full thickness".

The operation is of great importance because, as explained, it avoids all manual grinding or polishing, and by a single movement or operation accomplishes that which has heretofore required two movements or operations to accomplish.

It is to be borne in mind that the result could not be accomplished without presenting the article to be cut to the two members of the cutting instrumentality, which have relative movements one with regard to the other in parallel axial planes, at an angle to the longitudinal axes or planes of movement of said cutting members, the angle being preferably, but not necessarily, one of forty-five degrees. Thus, it is my opinion that that which I have first accomplished in an art with which I am practically familiar, is accomplished as the result of the angular presentation of the plate to be cut to the movement of approach in parallel or coincident axes, of cutting members which occupy planes of parallel disposition,—and this without regard to whether one or both members move. By this I mean it to be understood, that, although in practice I have invented the machine described and represented as a good construction in which one of the die members is fixed and the other movable, yet that the result would be accomplished if both were movable, or if their positions were transposed and the recessed die or concave member were made the movable member and the outwardly-rounded die or convex member made the fixed member.

So far as I am aware, I am the first in the art to produce a machine of the character described for trimming in the manner described the ends of the leaves, bars or plates of elliptical springs, and my claims to these features are, therefore, to be construed with the breadth of view awarded claims of an essentially generic character.

It will now be apparent that I have devised a novel and useful construction which embodies the features of advantage enumerated as desirable, and that while in the present instance I have shown and described a preferred embodiment which has in practice been found to give satisfactory and reliable results, it is to be understood that the embodiment is susceptible of modification in various particulars without departing from the spirit or scope of the invention or sacrificing any of its advantages.

Having thus described my invention, I claim and desire to secure by Letters Patent:—

1. A machine for trimming the ends of bars, comprising in combination a fixed cutter and a movable cutter which possess the conformation of opposite counterparts and have oppositely inclined cutting ends and one of which is externally longitudinally convex and the other internally longitudinally concave and channeled to receive the under convex side of said movable cutter, and provided with a rearwardly extending angular carrying face to receive the end of the article to be cut, and means for occasioning the reciprocation of the movable cutter relatively to the fixed cutter, and means for directing the bar to be cut toward and between the cutting edges of the cutters at an angle to their respective longitudinal axial planes.

2. A machine for trimming the ends of bars, comprising in combination a fixed cutter the cutting edge of which is beveled to form a carrying face and which is longitudinally concave, a movable cutter the cutting edge of which is shaped to oppositely correspond to the cutting edge of the fixed cutter and which is longitudinally convex, means for occasioning the reciprocation of the moving cutter relatively to the fixed cutter, and means for directing the bar to be cut between the cutting edges of the two cutters at an angle to their respective longitudinal axial planes.

3. A machine for trimming the ends of bars, comprising in combination a fixed cutter the cutting edge of which is beveled to form a carrying face and which is longitudinally concave, a movable cutter the cutting edge of which is shaped to oppositely correspond to the cutting edge of the fixed cutter and which is longitudinally convex, means for occasioning the reciprocation of the moving cutter relatively to the fixed cutter, means for directing the bar to be cut between the cutting edges of the two cutters at an angle to their respective longitudinal axial planes, and a gage for directing the bar to be cut upon the carrying face of the fixed cutter.

4. A machine for trimming the ends of bars, comprising in combination a fixed cutter the cutting edge of which is beveled to form a carrying face, a movable cutter the cutting edge of which is shaped to oppositely correspond to the cutting edge of the fixed cutter which is longitudinally concaved for the reception of the under convex side of said movable cutter, means for occasioning the reciprocation of the moving cutter relatively to the fixed cutter, means for controlling said reciprocation, and means for directing the bar to be cut between the cutting edges of the two cutters at an angle to their respective longitudinal axial planes.

5. A machine for trimming the ends of bars, comprising in combination a fixed cutter the cutting edge of which is beveled to form a carrying face, a movable cutter the cutting edge of which is convex and generally correspondent to the concave cutting edge of the fixed cutter, means for occasioning the reciprocation of the moving cutter relatively to the fixed cutter, means for controlling said reciprocation, means for directing the bar to be cut between the cutting edges of the two cutters at an angle to their respective longitudinal axial planes, and a gage coacting with the carrying face of the fixed cutter for directing the bar to be cut relatively to both cutters.

6. A machine for trimming the ends of bars, comprising in combination two cutters, means for occasioning the reciprocation of one of them relatively to the other, means for directing the bar to be cut toward said cutters at an angle to their respective longitudinal axial planes, a grinding mechanism, a prime mover for operating both the cutters and the grinding mechanism, and connective means for occasioning the operation of both the cutters and the grinding mechanism.

7. A machine for trimming the ends of bars, comprising in combination two cutters, means for occasioning the reciprocation of one of them relatively to the other, means for directing the bar to be cut toward said cutters at an angle to their respective longitudinal axial planes, a gage for directing the bar to be cut toward said cutters at an angle to their relative longitudinal axes, a grinding mechanism, a prime mover for operating both the cutters and the grinding mechanism, and connective means for occasioning the operation of both the cutters and the grinding mechanism.

8. A machine for trimming the ends of bars, comprising in combination a reciprocating cutter, means for occasioning the reciprocation of said cutter, and a fixed cutter formed with a cutting and carrying face for directing the bar to be cut toward the cutting edge of the reciprocating cutter at an angle to the respective longitudinal axial planes of both cutters.

9. In a machine for trimming the ends of bars, a movable cutting die having a convex under face, means for actuating said die, and a fixed die having a concave cutting face, a longitudinally extending concave portion and a rearwardly extending angular face adapted to receive the end of the article to be trimmed.

10. In a machine for trimming the ends of bars, an inclined movable cutting die having a convex under face, means for actuating said die, and an inclined fixed die having a concave cutting face, a longitudinally extending concave portion and a rearwardly extending angular face adapted to receive the end of the article to be trimmed.

In testimony whereof I have hereunto signed my name this first day of May, 1915.

WILLIAM EVANS.

In the presence of—
J. Bonsall Taylor,
Harry Plant.

Copies of this patent may be obtained for five cents each, by addressing the "Commissioner of Patents, Washington, D. C."